(12) United States Patent
Yin (10) Patent No.: US 11,658,478 B2
(45) Date of Patent: May 23, 2023

(54) GRID CONNECTED INVERTER, AND METHOD FOR REDUCING GRID FREQUENCY VARIATION

(71) Applicant: FUJI ELECTRIC CO., LTD., Kanagawa (JP)

(72) Inventor: Songhao Yin, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 316 days.

(21) Appl. No.: 17/155,557

(22) Filed: Jan. 22, 2021

(65) Prior Publication Data

US 2021/0296883 A1    Sep. 23, 2021

(30) Foreign Application Priority Data

Mar. 19, 2020    (JP) ............................. JP2020-048626

(51) Int. Cl.
*H02H 7/22*    (2006.01)
*H02M 7/48*    (2007.01)
(Continued)

(52) U.S. Cl.
CPC ............. *H02H 7/122* (2013.01); *H02J 3/381* (2013.01); *H02M 7/48* (2013.01); *H02J 2300/24* (2020.01)

(58) Field of Classification Search
CPC ...... H02H 7/122; H02J 3/381; H02J 2300/24; H02M 7/48
See application file for complete search history.

(56) References Cited

U.S. PATENT DOCUMENTS

2011/0270463 A1* 11/2011 Weiss ...................... H02P 23/12
                                                              700/297
2019/0109461 A1*  4/2019 Khajehoddin ............ H02J 3/40
(Continued)

FOREIGN PATENT DOCUMENTS

CN    109888796 A  *  6/2019
CN    110474347 A  * 11/2019
(Continued)

OTHER PUBLICATIONS

M.P.N Van Wesenbeeck et al., "Grid Tied Converter with Virtual Kinetic Storage", Paper accepted for presentation at 2009 IEEE Bucharest Power Tech Conference, Jun 28-Jul. 2, Bucharest, Romania, pp. 1-7.

*Primary Examiner* — Sisay G Tiku
(74) *Attorney, Agent, or Firm* — IPUSA, PLLC (57) ABSTRACT

A grid connected inverter is connectable to a power grid having a synchronous generator connected thereto, and is operable according to an output active power command generated by a virtual synchronous generator control function, to thereby reduce grid frequency variation. The output active power command is represented by a sum of a set value of the output active power of the grid connected inverter, a value obtained by multiplying a pseudo attenuation coefficient to a frequency deviation between a grid frequency and a reference frequency, and a value obtained by multiplying a pseudo inertia coefficient to a derivative value of the grid frequency. The pseudo inertia coefficient after the grid frequency reaches a maximum point of frequency variation is adjusted to a value smaller than the pseudo inertia coefficient before the grid frequency reaches the maximum point of frequency variation.

14 Claims, 5 Drawing Sheets

(51) Int. Cl.
 *H02J 3/38* (2006.01)
 *H02H 7/122* (2006.01)

(56) References Cited

U.S. PATENT DOCUMENTS

2019/0285671 A1* 9/2019 Ventola .............. G01R 19/2513
2020/0335978 A1* 10/2020 Ren .......................... H02J 3/24
2021/0320502 A1* 10/2021 Yin ......................... H02M 7/48

FOREIGN PATENT DOCUMENTS

| CN | 111884267 B | * | 12/2021 | ................ H02J 3/24 |
| DE | 102021101836 A1 | * | 9/2021 | ............. H02H 7/122 |
| DE | 102021101836 B4 | * | 6/2022 | ............. H02H 7/122 |
| JP | 2019-003454 | | 1/2019 | |
| JP | 2019003454 A | * | 1/2019 | |
| JP | 2020025394 A | * | 2/2020 | |
| JP | 6735039 B1 | * | 8/2020 | ............. H02H 7/122 |
| WO | WO-2012091102 A1 | * | 7/2012 | ........... F03D 7/0284 |
| WO | WO-2021220488 A1 | * | 11/2021 | |

* cited by examiner

GRID CONNECTED INVERTER, AND METHOD FOR REDUCING GRID FREQUENCY VARIATION

CROSS-REFERENCE TO RELATED APPLICATIONS

This application is based upon and claims priority to Japanese Patent Application No. 2020-048626 filed on Mar. 19, 2020, the entire contents of which are incorporated herein by reference.

BACKGROUND OF THE INVENTION

1. Field of the Invention

The present disclosure relates to a grid connected inverter which reduces a grid frequency variation by the so-called Virtual Synchronous Generator (VSG), and a method for reducing the grid frequency variation.

2. Description of the Related Art

Inverters that convert DC power output from renewable energy power systems, such as photovoltaic power systems or the like, into AC power and supply the AC power to power grids, are normally operated in synchronism with the grid frequency under Phase Locked Loop (PLL) control. As is well known, unlike a synchronous generator having a rotor, the inverter is a stationary type electrical apparatus including semiconductor power switching elements. Hence, the inverter is not provided with a function to reduce the grid frequency variation by an inertial force of the rotor.

Particularly if the number of renewable energy power systems increases, and the number of synchronous generators relatively decreases, the grid frequency is liable to vary significantly due to sudden changes in the load and output fluctuations of the renewable energy power systems.

Accordingly, a technique for stabilizing the system by providing a pseudo inertial force in the inverter, to realize a frequency variation reducing function of the synchronous generator, is referred to as the Virtual Synchronous Generator (VSG) control. Such a frequency variation reducing function is sometimes also referred to as the VSG function.

Figure 1:
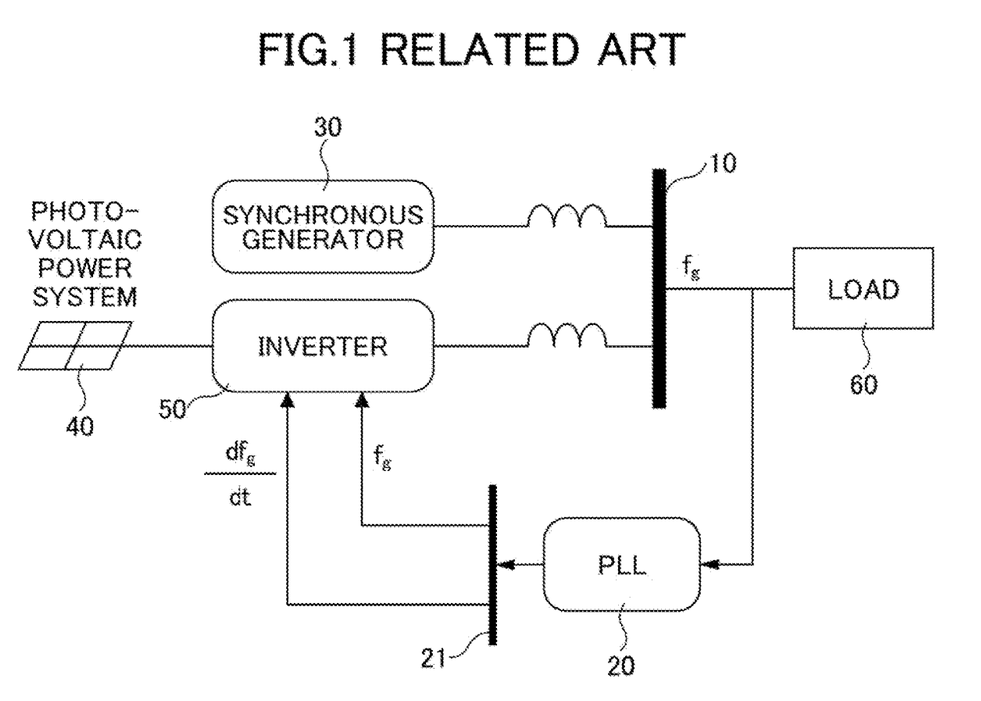
FIG. 1 is a schematic diagram illustrating a configuration of a grid connected inverter having the VSG function.

FIG. 1 is a schematic diagram illustrating a configuration of a grid connected inverter having the VSG function described above.

In FIG. 1, a synchronous generator 30 is connected to a power grid 10, to supply AC power to a load 60. In addition, a PLL circuit 20 is connected to the power grid 10, and a grid frequency $f_g$ detected by the PLL circuit 20 and a derivative $df_g/dt$ thereof are input to an inverter 50 via a signal line 21. The inverter 50 includes a main circuit including power semiconductor switching elements for performing DC-AC conversion, and a control circuit for controlling the main circuit.

A DC input side of the inverter 50 is connected to a renewable energy power system, such as a photovoltaic power system 40 or the like, and an AC output side of the inverter 50 is connected to the power grid 10.

The number of each of the synchronous generator 30 and the inverter 50 (and the photovoltaic power system 40) illustrated in FIG. 1 is not limited to one. In a case where a plurality of synchronous generators and a plurality of inverters are connected to the power grid 10, the synchronous generator 30 illustrated in FIG. 1 corresponds to a group or collection of the plurality of synchronous generators, and the inverter 50 illustrated in FIG. 1 corresponds to a group or collection of the plurality of inverters.

According to the configuration described above, the inverter 50 reduces the variation of the grid frequency $f_g$ caused by sudden changes in the load 60 or the like, by the VSG function described below.

In other words, an active power (command) output from the inverter 50 is computed from the following formula (1) which is indicated as a formula 18 in "Grid Tied Converter with Virtual Kinetic Storage", M. P. N van Wesenbeeck et al., 2009 IEEE Bucharest Power Tech Conference, June 28th-July 2nd (hereinafter simply referred to as "Non-Patent Document 1"), for example.

$$P_{inv} = P_0 - k_{vd}(f_g - f_0) - k_{vi}\frac{df_g}{dt} \quad \text{[formula (1)]}$$

In the formula (1), $P_{inv}$ denotes the output active power (command) of the inverter 50, $P_0$ denotes a set value of the output active power of inverter 50, $k_{vd}$ denotes a pseudo attenuation coefficient, $k_{vi}$ denotes a pseudo inertia coefficient (or coefficient of pseudo inertia), $f_g$ denotes an actual grid frequency, and $f_0$ denotes a reference frequency (for example, 50 [Hz] or 60 [Hz]) of the power grid 10.

According to the formula (1), the output active power $P_{inv}$ of the inverter 50 is computed by subtracting an adjusting amount from the set value $P_0$ of the output active power, where the adjusting amount is a sum of a pseudo attenuation component (a second term on the right side of the equal sign in the formula (1)) according to a grid frequency variation, that is, a frequency deviation $(f_g-f_0)$, and a pseudo attenuation component (a third term on the right side of the equal sign in the formula (1)) according to a derivative $(df_g/dt)$ of the grid frequency $f_g$. By operating the inverter 50 using the value of this output active power $P_{inv}$ as the output active power command, it is possible to reduce the variation of the grid frequency $f_g$.

Conventionally, suitably selected fixed values are used for the pseudo attenuation coefficient $k_{vd}$ and the pseudo inertia coefficient $k_{vi}$.

In addition, Japanese Laid-Open Patent Publication No. 2019-3454 (hereinafter simply referred to as "Patent Document 1"), at paragraphs 0026-0033, FIGS. 1 and 2, or the like, describes a VSG function similar to that of the Non-Patent Document 1. More particularly, a frequency variation reducing amount corresponding to an inertial force of the synchronous generator is computed by a generator inertial force generating unit provided in the control circuit of the inverter, based on a phase error with respect to a grid voltage that is obtained by delaying a response of a PLL circuit upon a sudden change of the load, and the computed frequency variation reducing amount is added to an active power target value of the inverter, to improve the decreasing grid frequency.

According to the technique described in the Non-Patent Document 1, after the frequency deviation $(f_g-f_0)$ reaches a maximum value, a control is carried out so that the grid frequency $f_g$ converges to the reference frequency $f_0$. However, because the pseudo inertia coefficient $k_{vi}$ is set to the fixed value, there is a problem in that a convergence speed of the grid frequency $f_g$ is slow.

On the other hand, the Patent Document 1 does not describe a specific method for recovering the grid frequency $f_g$, which varies when the sudden changes in the load occur, within a short period of time.

SUMMARY OF THE INVENTION

Accordingly, it is an object in one aspect of the embodiments to provide a grid connected inverter which reduces the grid frequency variation, and a method for reducing the grid frequency variation, which can reduce the grid frequency variation caused by sudden changes in the load, or an output variation of the renewable energy power system within a short period of time.

According to one aspect of the embodiments, a grid connected inverter connectable to a power grid having a synchronous generator connected thereto, and operable according to an output active power command generated by a virtual synchronous generator control function, to thereby reduce grid frequency variation, includes a main circuit including power semiconductor switching elements that turn on and off according to the output active power command, to perform DC-AC conversion; and a control circuit configured to control the main circuit, wherein the output active power command is represented by a sum of a set value of the output active power of the grid connected inverter, a value obtained by multiplying a pseudo attenuation coefficient to a frequency deviation between a grid frequency and a reference frequency, and a value obtained by multiplying a pseudo inertia coefficient to a derivative value of the grid frequency, and wherein the control circuit adjusts the pseudo inertia coefficient after the grid frequency reaches a maximum point of frequency variation to a value smaller than the pseudo inertia coefficient before the grid frequency reaches the maximum point of frequency variation.

A renewable energy power system may be connected as a DC power supply of the grid connected inverter.

The control circuit may adjust the pseudo inertia coefficient to reduce the grid frequency variation caused by sudden changes in a load connected to the power grid, or an output variation of a renewable energy power system connected as a DC power supply of the grid connected inverter.

The control circuit may set the value of the pseudo inertia coefficient after the grid frequency reaches the maximum point of frequency variation, based on an inertia of the synchronous generator before the grid frequency reaches the maximum point of frequency variation, and an inertia coefficient of the entire power grid after the grid frequency reaches the maximum point of frequency variation.

The control circuit may compute the inertia of the synchronous generator before the grid frequency reaches the maximum point of frequency variation, based on a mechanical input variation of the synchronous generator, a load variation that is independent of the grid frequency, an attenuation coefficient of the synchronous generator, the pseudo attenuation coefficient, the pseudo inertia coefficient, the frequency deviation between the grid frequency and the reference frequency, the derivative value of the grid frequency, and the pseudo inertia coefficient, at a time before the grid frequency reaches the maximum point of frequency variation.

According to another aspect of the embodiments, a method for reducing grid frequency variation in a grid connected inverter, connectable to a power grid having a synchronous generator connected thereto, includes operating the grid connected inverter according to an output active power command, generated by a virtual synchronous generator control function, and represented by a sum of a set value of the output active power of the grid connected inverter, a value obtained by multiplying a pseudo attenuation coefficient to a frequency deviation between a grid frequency and a reference frequency, and a value obtained by multiplying a pseudo inertia coefficient to a derivative value of the grid frequency; and adjusting the pseudo inertia coefficient after the grid frequency reaches a maximum point of frequency variation to a value smaller than the pseudo inertia coefficient before the grid frequency reaches the maximum point of frequency variation, to generate the output active power command after the grid frequency reaches the maximum point of frequency variation.

The operating may operate the grid connected inverter according to the output active power command represented by a sum of the set value of the output active power of the grid connected inverter, and the value obtained by multiplying the pseudo attenuation coefficient to the frequency deviation between the grid frequency and the reference frequency, when the frequency deviation between the grid frequency and the reference frequency is smaller than a first threshold value, and the output active power command at a time after the grid frequency reaches the maximum point of frequency variation, when the frequency deviation between the grid frequency and the reference frequency exceeds first threshold value.

The adjusting may adjust the pseudo inertia coefficient to reduce the grid frequency variation caused by sudden changes in a load connected to the power grid, or an output variation of a renewable energy power system connected as a DC power supply of the grid connected inverter.

Other objects and further advantages of the present invention will now be apparent from the description set forth below in conjunction with the drawings.

DESCRIPTION OF THE PREFERRED EMBODIMENTS

Embodiments of the present invention will be described below, by referring to the drawings.

Figure 2:
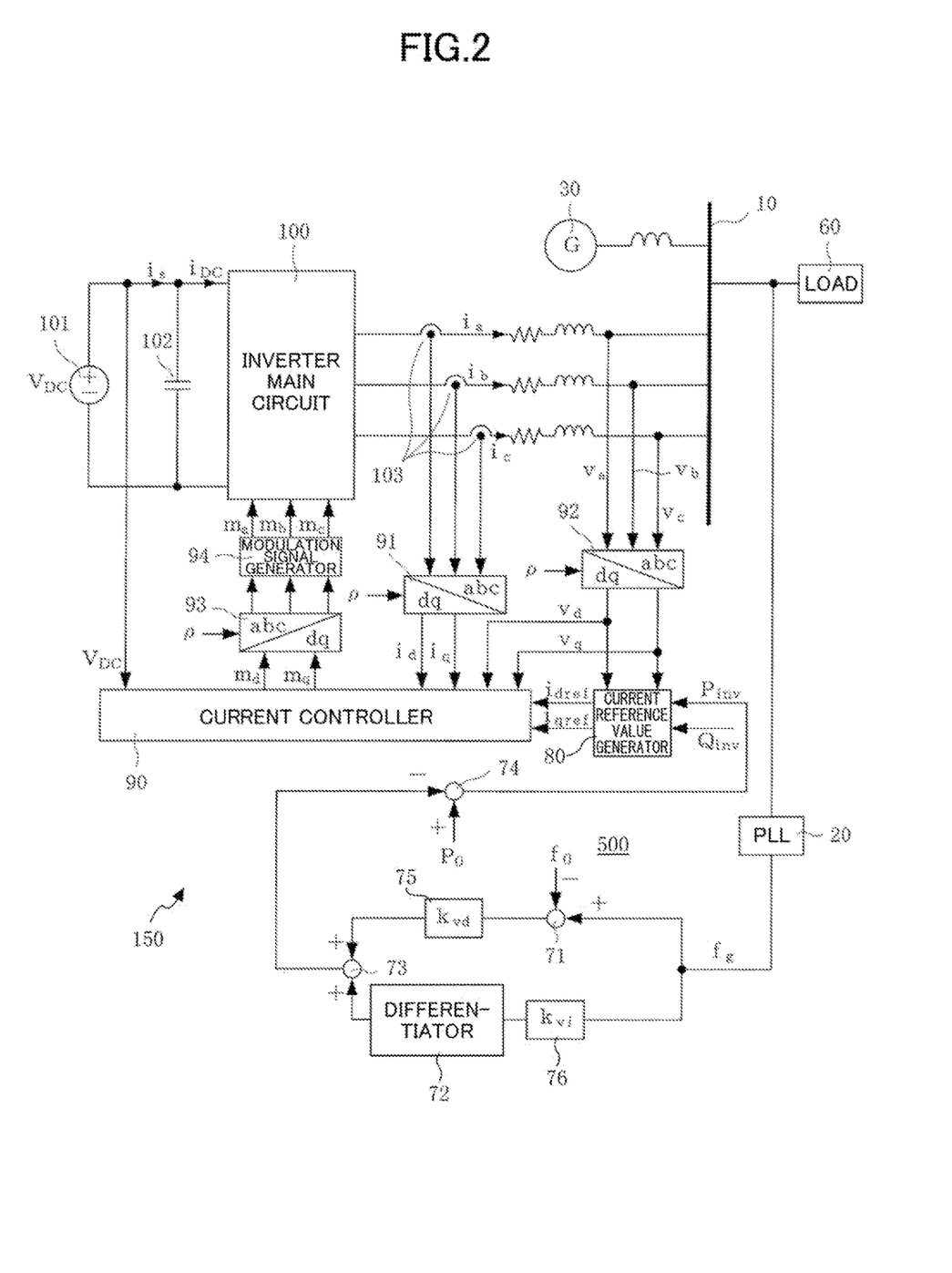
FIG. 2 is a diagram illustrating a configuration of a grid connected inverter according to one embodiment of the present invention.

FIG. 2 is a diagram illustrating a configuration of a grid connected inverter 150 according to one embodiment of the present invention, which is connectable to the power grid 10. The grid connected inverter 150 includes an inverter main circuit 100 and a control circuit 500. In FIG. 2, those parts that are the same as those corresponding parts in FIG. 1 are designated by the same reference numerals, and a description thereof may be omitted.

The control circuit 500 generates an output active power command $P_{inv}$, and controls the inverter main circuit 100 based on the output active power command $P_{inv}$. The control circuit 500 includes subtractors 71 and 74, a differentiator 72, multipliers 75 and 76, and an adder 73.

In FIG. 2, the grid frequency fg detected by the PLL circuit 20 is input to the subtractor 71 which computes a deviation $(f_g-f_0)$ from the reference frequency $f_0$. The multiplier 75 multiplies the deviation $(f_g-f_0)$ by the pseudo attenuation coefficient $k_{vd}$, and inputs a result of this multiplication to the adder 73.

In addition, the grid frequency fg detected by the PLL circuit 20 is also input to the multiplier 76 which multiplies the grid frequency $f_g$ by the pseudo inertia coefficient $k_{vi}$ which is a variable, and a result of this multiplication is input to the differentiator 72 which differentiates the result of this multiplication. An output of the differentiator 72 is input to the adder 73.

The adder 73 adds the two inputs from the multiplier 75 and the differentiator 72, respectively, and an output of the adder 72 is input to the subtractor 74. The subtractor 74 subtracts the output of the adder 73 from a set value $P_0$ of an output active power of the grid connected inverter 150, and obtains the output active power command $P_{inv}$. This output active power command $P_{inv}$ is input to a current reference value generator 80.

In addition to the output active power command $P_{inv}$, a reactive power command $Q_{inv}$ is separately input to the current reference value generator 80. The current reference value generator 80 generates d-axis and q-axis current command values $i_{dref}$ and $i_{qref}$ based on these inputs thereto, and outputs the d-axis and q-axis current command values $i_{dref}$ and $i_{qref}$ to a current controller 90.

On the other hand, a DC power supply 101 and a DC intercondenser 102, corresponding to a renewable energy power system, are connected in parallel on a DC input side of the inverter main circuit 100. In this example, the inverter main circuit 100 is formed by a three-phase inverter main circuit having a known configuration including the power semiconductor switching elements. An AC output side of the inverter main circuit 100 is connected to the power grid 10.

Output currents $i_a$, $i_b$, and $i_c$ of each of the phases of the inverter main circuit 100 are detected by a current detector 103, and converted into d-axis and q-axis currents $i_d$ and $i_q$ by a coordinate transformation circuit 91. The d-axis and q-axis currents $i_d$ and $i_q$ are input to the current controller 90. In addition, output voltages $v_a$, $v_b$, and $v_c$ of each of the phases of the inverter main circuit 100 are converted into d-axis and q-axis voltages $v_d$ and $v_q$ by a coordinate transformation circuit 92. The d-axis and q-axis voltages $v_d$ and $v_q$ are input to the current controller 90.

A phase angle ρ, used for performing the coordinate transformation, is input to each of the coordinate transformation circuits 91 and 92, and a coordinate transformation circuit 93 which will be described later.

The current controller 90 generates d-axis and q-axis modulation commands $m_d$ and $m_q$, based on the d-axis and q-axis current command values $i_{dref}$ and $i_{qref}$ from the current reference value generator 80, the d-axis and q-axis currents $i_d$ and $i_q$ from the coordinate transformation circuit 91, and the d-axis and q-axis voltages $v_d$ and $v_q$ from the coordinate transformation circuit 92. The d-axis and q-axis modulation commands $m_d$ and $m_q$ are converted into modulation signals $m_a$, $m_b$, and $m_c$ of each of the three phases, by the coordinate transformer 93 and a modulation signal generator 94. These modulation signals $m_a$, $m_b$, and $m_c$ are input to the inverter main circuit 100. In the inverter main circuit 100, the semiconductor switching elements are turned on and off by a Pulse Width Modulation (PWM) control or the like, using the modulation signals $m_a$, $m_b$, and $m_c$, and DC power of the DC power supply 101 is converted into AC power and supplied to the power grid 10.

An equation of motion (oscillation or swing equation) for a model of the synchronous generator 30 may be represented by the following formula (2).

$$M\frac{df_m}{dt} = \Delta P_m - \Delta P_e \qquad [\text{formula (2)}]$$

In the formula (2), M denotes an inertia of the synchronous generator 30 (of reduced model for a case where the inertias of a plurality of synchronous generators 30 connected to the power grid 10 are integrated into one inertia), $f_m$ denotes a rotation frequency (of the rotor) of the synchronous generator 30, $\Delta P_m$ denotes a mechanical input variation of synchronous generator 30, and $\Delta P_e$ denotes an electrical output variation of the synchronous generator 30.

From the formula (1) described above, a variation $\Delta P_{inv}$ of the active power output from the grid connected inverter 150 can be expressed by the following formula (3).

$$\Delta P_{inv} = -k_{vd}(f_g - f_0) - k_{vi}\frac{df_g}{dt} \qquad [\text{formula (3)}]$$

In addition, as represented by the following formula (4), a sum of the active power variation $\Delta P_{inv}$ and the electrical output variation $\Delta P_e$ of the synchronous generator 30, is equal to an active power variation $\Delta P_L$ of the load 60. Further, the active power variation $\Delta P_L$ is a sum of a load variation $\Delta P_{L0}$ that is independent of the grid frequency $f_g$, and a product of an attenuation coefficient D and the frequency deviation $(f_g-f_0)$ of the synchronous generator 30.

$$\Delta P_{inv}+\Delta P_e=\Delta P_L=\Delta P_{L0}+D(f_g-f_0) \qquad [\text{formula (4)}]$$

If $f_m \approx f_g$ in the formula (2) described above, an extension equation of motion of the synchronous generator 30 can be represented by the following formula (5), based on the formulas (2) through (4).

$$(M + k_{vi})\frac{df_g}{dt} + (D + k_{vd})(f_g - f_0) = \Delta P_m - \Delta P_{L0} \qquad [\text{formula (5)}]$$

In the formula (5) described above, $(M+k_{vi})$ denotes an inertia coefficient of the entire power grid 10 (including the inertia output by the grid connected inverter 150), and $(D+k_{vd})$ denotes an attenuation coefficient of the entire power grid 10.

In this embodiment, in a case where the grid frequency $f_g$ decreases from the reference frequency $f_0$ due to the load variation, for example, the pseudo inertia coefficient $k_{vi}$ is increased to increase the inertia coefficient $(M+k_{vi})$ of the entire power grid 10 of the formula (5) to a large value, during a period of time in which the grid frequency $f_g$ separates more from an estimated convergence value $f_\infty$, in a region where the grid frequency $f_g$ is smaller than the convergence value $f_\infty$. On the other hand, the pseudo inertia coefficient $k_{vi}$ is decreased to decrease the inertia coefficient (M+$k_{vi}$) of the entire power grid 10 of the formula (5) to a small value, during a period of time in which the grid frequency $f_g$ approaches more toward the convergence value $f_\infty$, in the region where the grid frequency $f_g$ is smaller than the convergence value $f_\infty$. As a result, it is possible to increase a recovery speed of the grid frequency $f_g$. The inertia coefficient (M+$k_{vi}$) of the entire power grid 10, and the inertia M of the synchronous generator 30, have positive values.

In other words, in the case where the grid frequency $f_g$ varies in the region where the grid frequency $f_g$ is smaller than the convergence value $f_\infty$, the pseudo inertia coefficient $k_{vi}$ is increased until the grid frequency $f_g$ reaches a maximum point of frequency variation, and the pseudo inertia coefficient $k_{vi}$ is decreased during the period of time in which the grid frequency $f_g$ approaches the convergence value $f_\infty$ after reaching the maximum point of frequency variation.

By adjusting the pseudo inertia coefficient $k_{vi}$ of the grid connected inverter 150 in this manner, it is possible to recover the grid frequency $f_g$ in a short period of time compared to the conventional case where the pseudo inertia coefficient $k_{vi}$ is set to a fixed value.

Because the derivative value ($df_g/dt$) of the grid frequency $f_g$ is zero at the maximum point of frequency variation described above, the formula (5) can be expressed by the following formula (6). In the formula (6), $f_{min}$ denotes a minimum frequency of the maximum point of frequency variation, and $t_2$ denotes a time when the maximum point of frequency variation occurs.

$$\Delta P_{L0} = -(D+k_{vd})(f_{min}-f_0)+\Delta P_m(t_2) \quad \text{[formula (6)]}$$

Figure 3:
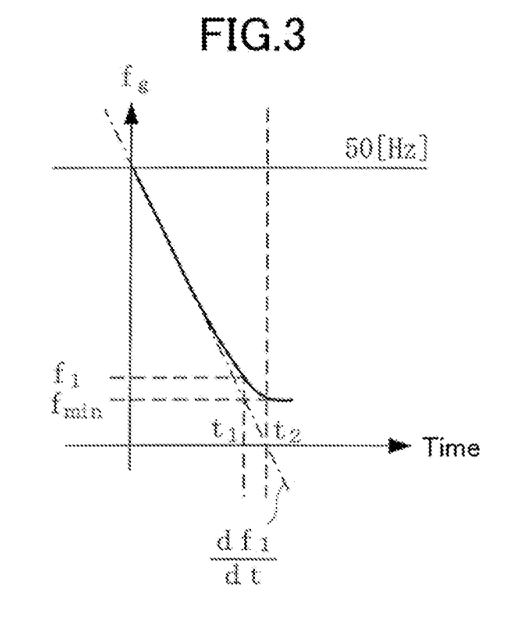
FIG. 3 is a diagram for explaining a maximum point of frequency variation in one embodiment of the present invention.

FIG. 3 is a diagram for explaining the maximum point of frequency variation in one embodiment of the present invention. FIG. 3 illustrates the minimum frequency $f_{min}$, the time $t_2$, or the like of the maximum point of frequency variation, as well as a time $t_1$ before the time $t_2$, a corresponding frequency $f_1$ at the time $t_1$, and a rate of frequency change, ($df_1/dt$), which is a derivative of the frequency $f_1$ and is indicated by a one-dot chain line.

Next, the convergence value $f_\infty$ of the grid frequency $f_g$, required to adjust the pseudo inertia coefficient $k_{vi}$ as described above, may be estimated in the following manner.

First, a relationship represented by the following formula (7) exists between an amount of change, $\Delta F$, of the rotation frequency of the synchronous generator 30, and the load variation $\Delta P_{L0}$ described above. In the formula (7), s denotes the Laplace operator, and G(s) denotes the transfer function.

$$\Delta F(s) = G(s)\Delta P_{L0}(s) \quad \text{[formula (7)]}$$

From the formula (7) and the final value theorem, the convergence value $f_\infty$ of the grid frequency $f_g$ can be estimated by the following formula (8).

$$\text{Steady-State Value } \lim_{t\to\infty}\Delta f(t) = \lim_{s\to 0}sG(s)\Delta P_{L0}(s) \quad \text{[formula (8)]}$$

Figure 4:
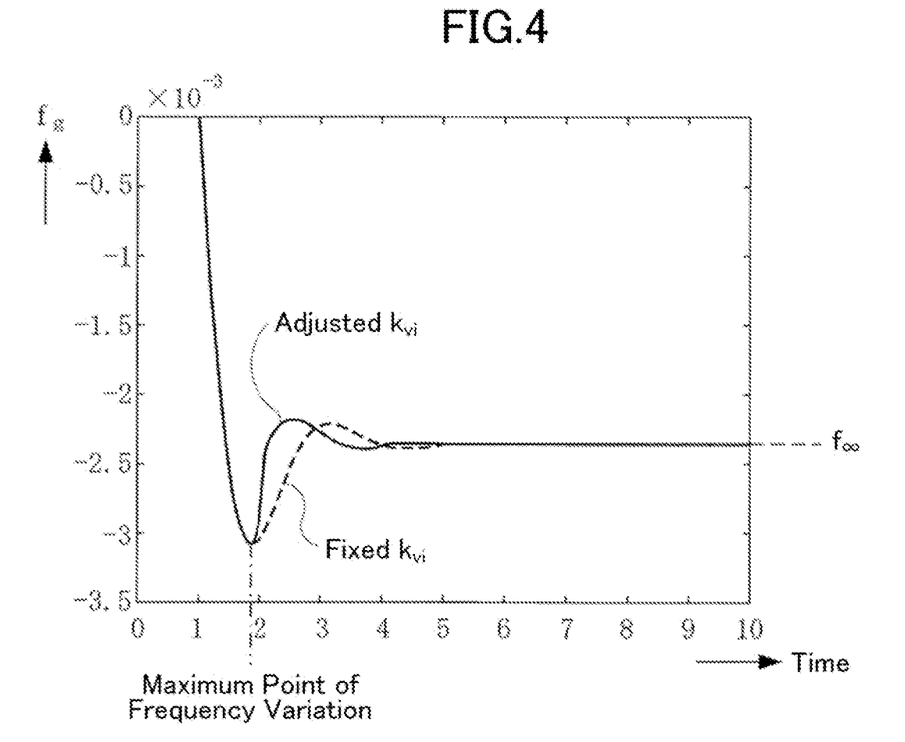
FIG. 4 is a schematic diagram illustrating a recovery state of a grid frequency for a case where a pseudo inertia coefficient is adjusted according to one embodiment of the present invention, and a case where the pseudo inertia coefficient is fixed as in a conventional case.

FIG. 4 is a schematic diagram illustrating a recovery state of the grid frequency $f_g$ for a case where the pseudo inertia coefficient $k_{vi}$ is adjusted according to this embodiment, and a case where the pseudo inertia coefficient $k_{vi}$ is fixed as in the conventional case. As may be seen from FIG. 4, the time required to restore the grid frequency $f_g$ to fall within a predetermined range centered on the convergence value $f_\infty$ in this embodiment, as indicated by a solid line, is shorter than that of the conventional case indicated by a dotted line. This shorter time required to restore the grid frequency $f_g$ in this embodiment contributes to a quicker stabilization of the grid frequency $f_g$ when compared to the conventional case.

Next, a method of computing the output active power of the grid connected inverter 150 according to the variation state of the grid frequency $f_g$, will be described with reference to FIG. 5 and FIG. 6.

Figure 5:
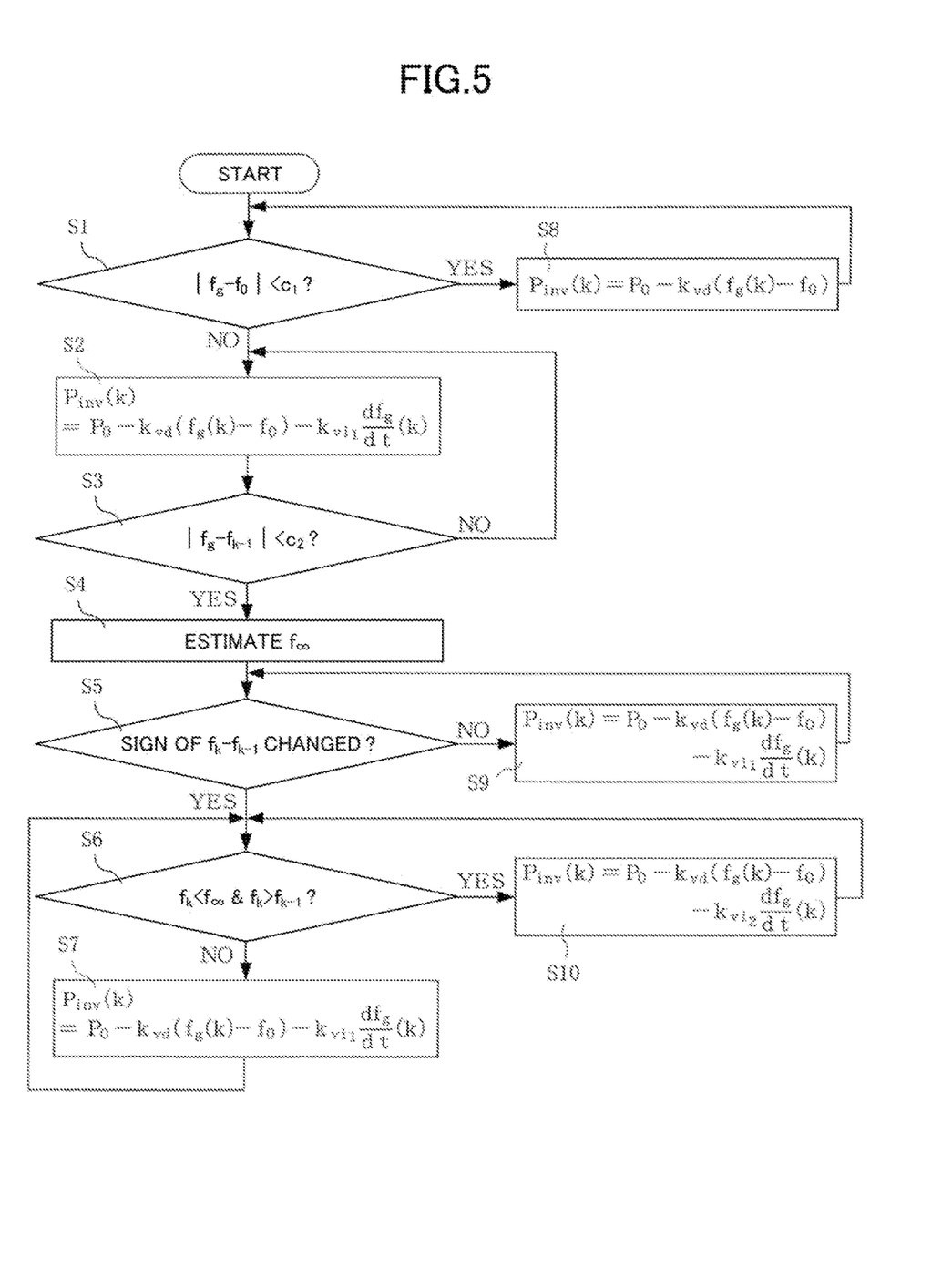
FIG. 5 is a flow chart illustrating a method of computing an output active power according to a grid frequency variation in one embodiment of the present invention.

A process of a flow chart illustrated in FIG. 5 is performed by the control circuit 500 of the grid connected inverter 150 illustrated in FIG. 2, at a predetermined control period. The control circuit 500 controls the inverter main circuit 100 of the grid connected inverter 150. In this example, k denotes a current time, and (k−1) denotes a time one control period before the current time k.

Figure 6:
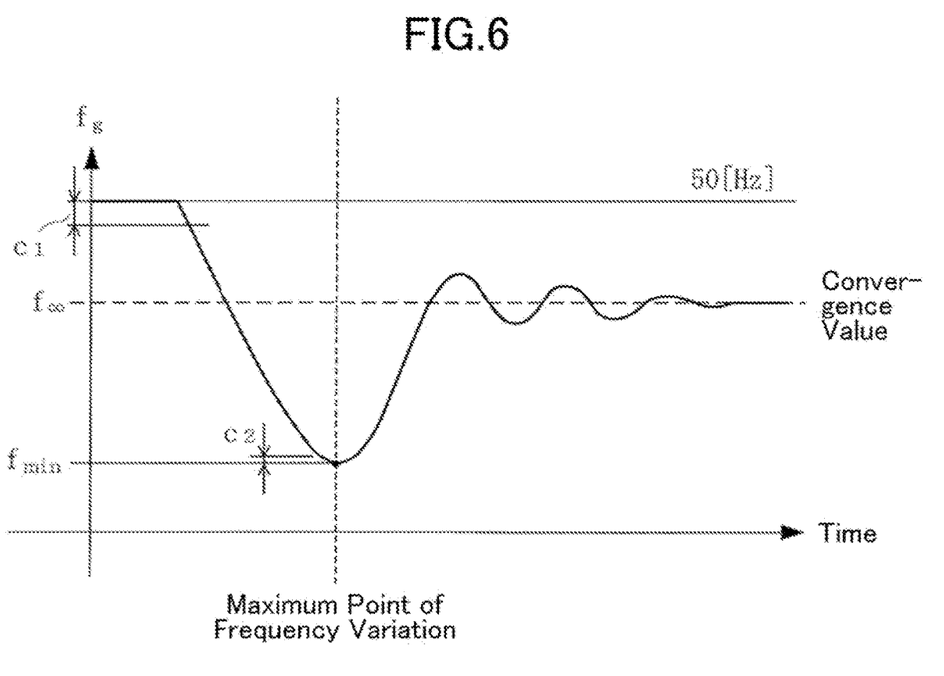
FIG. 6 is a waveform diagram illustrating an example of the grid frequency variation in one embodiment of the present invention.

Further, FIG. 6 is a waveform diagram illustrating an example in which the grid frequency $f_g$ varies, that is, the grid frequency variation occurs, in one embodiment of the present invention.

In the following, a case where the grid frequency fg decreases will be described in this embodiment. However, in a modification of this embodiment, for example, the present disclosure is similarly applicable to a case where the grid frequency $f_g$ increases.

First, in FIG. 5, a determination is made to determine whether or not an absolute value of the deviation between the grid frequency $f_g$ at the current time k and the reference frequency $f_0$ (for example, 50 [Hz]) is smaller than the first preset threshold value $c_1$, in step S1. Step S1 is performed to determine whether or not the grid frequency $f_g$ decreased (or increased) significantly.

If the grid frequency $f_g$ did not decrease significantly and the decision result in step S1 is YES, the active power command of a normal mode is output to the grid connected inverter 150 in step S8. On the other hand, if the grid frequency $f_g$ did decrease significantly and the decision result in step S1 is NO, the process advances to step S2.

The pseudo inertia coefficient $k_{vi}$ of the grid connected inverter 150 is set to a first pseudo inertia coefficient $k_{vi1}$ and the active power command $P_{inv}(k)$ at the current time k is computed from the formula (1) and input to the grid connected inverter 150, in step S2.

Next, a determination is made to determine whether or not an absolute value of a difference between the grid frequency $f_k$ at the current time k and the grid frequency $f_{k-1}$ at the time (k−1) is smaller than a second threshold value $c_2$, in step S3. Step S3 is used to determine whether or not the grid frequency $f_g$ reached a maximum point of frequency variation illustrated in FIG. 6.

A relationship of magnitudes of the first threshold value $c_1$ and the second threshold value $c_2$ is $c_1 \gg c_2$, as illustrated in FIG. 6. For example, $c_1$=0.3, and $c_2$=0.001.

The process returns to step S2 if the grid frequency $f_g$ did not reach the maximum point of frequency variation and the decision result in step S3 is NO. On the other hand, if the grid frequency $f_g$ did reach the maximum point of frequency variation and the decision result in step S3 is YES, the convergence value $f_\infty$ is estimated by the method described above, in step S4.

Next, a determination is made to determine whether or not the sign (or polarity) of $f_k-f_{k-1}$ changed, in step S5. Step S5 is used to determine a point where restoring of the grid frequency $f_g$ begins.

If the sign of $f_k-f_{k-1}$ did not change and the decision result in step S5 is NO, the active power command $P_{inv}(k)$ at the current time k is computed from the formula (1) and input to the grid connected inverter 150, in step S9, similar to step S2.

On the other hand if the sign of $f_k-f_{k-1}$ changed and the decision result in step S5 is YES, a determination is made to determine whether or not the grid frequency $f_g$, within a range smaller than the convergence value $f_\infty$, changes in a direction approaching the convergence value $f_\infty$, in step S6.

If the grid frequency $f_g$ changes in the direction approaching the convergence value $f_\infty$ and the decision result in step S6 is YES, the pseudo inertia coefficient $k_{vi}$ of the grid connected inverter 150 is set to a second pseudo inertia coefficient $k_{vi2}$ smaller than the first pseudo inertia coefficient $k_{vi1}$ ($k_{vi2}<k_{vi1}$ and $0<k_{vi2}$), and the active power command $P_{inv}(k)$ at the current time k is computed from the formula (1) and input to the grid connected inverter 150, in step S10.

On the other hand, if the grid frequency $f_g$ does not change in the direction approaching the convergence value $f_\infty$ and the decision result in step S6 is NO, the active power command $P_{inv}(k)$ at the current time k is computed from the formula (1) and input to the grid connected inverter 150, in step S7, similar to steps S2 and S9.

As long as the grid frequency $f_g$ is not restored to the reference frequency $f_0$, either step S7 or step S10 of FIG. 5 is performed. In addition, when the grid frequency $f_g$ is restored to the reference frequency $f_0$, the processes of step S1 and subsequent steps are successively repeated.

As described above, by performing the processes described above according to the variation state of the grid frequency $f_g$, the recovery speed can be increased for the case where the grid frequency $f_g$ changes in the direction approaching the convergence value $f_\infty$ after reaching the maximum point of frequency variation.

The operation to restore the grid frequency $f_g$ to the reference frequency $f_0$ is performed by the inertial force of the synchronous generator 30. However, in many cases, the adjusting function utilizing this inertial force does not activate immediately even when the grid frequency $f_g$ varies. Accordingly, the VSG function according to this embodiment is effective in reducing the variation of the grid frequency $f_g$ during a time until the adjusting function of the synchronous generator 30 becomes effective.

Next, a method for determining a numerical range for resetting the pseudo inertia coefficient $k_{vi}$ when setting the second pseudo inertia coefficient $k_{vi2}$ (the pseudo inertia coefficients $k_{vi}=k_{vi2}$, used on or after the time $t_2$ corresponding to the maximum point of frequency variation), to compute the active power command $P_{inv}(k)$ in step S10 of FIG. 5, will be described.

If a desired inertia coefficient of the entire power grid 10 after resetting the pseudo inertia coefficient $k_{vi}$ has a desired value M' ($M'=M+k_{vi2}$ and $M'>0$), this desired value M' needs to be smaller than the inertia coefficient ($M+k_{vi1}$) of the entire power grid 10 before resetting the pseudo inertia coefficient $k_{vi}$ in order to improve the recovery speed of the grid frequency $f_g$. For this reason, the following inequality (9) stands.

$k_{vi2}<k_{vi1}$ (when $0<k_{vi1}, 0<k_{vi2}$)

$-M<k_{vi2}$ (when $k_{vi2}<0$) [formula (9)]

However, according to the inequality (9) described above, the pseudo inertia coefficient $k_{vi}$ cannot be reset if the inertia M of the synchronous generator 30 is unknown.

Accordingly, the numerical range for resetting the pseudo inertia coefficient $k_{vi}$ may be obtained by the following method.

First, by substituting the formula (6) into the formula (5), the following formula (10) can be obtained. In the formula (10), $t_1$ denotes the time before the maximum point of frequency variation (time $t_2$), and $f_1$ denotes the grid frequency at this time $t_1$, as illustrated in FIG. 2, and $(df_1/dt)$ denotes the frequency variation rate.

$$(M+k_{vi})\frac{df_1}{dt} + (D+k_{vd})(f_1-f_0) = \Delta P_m(t_1) - \Delta P_{L0} \quad \text{[formula (10)]}$$

The following formula (11) can be obtained by rearranging the formula (10). In the formula (11), $k_{vi}$ of the second term on the right side of the equal sign denotes the pseudo inertia coefficient (corresponding to $k_{vi1}$ in steps S2, S7, and S9 of FIG. 5) before the maximum point of frequency variation.

The inertia M of the synchronous generator 30 is obtained from the formula (11), and the pseudo inertia coefficient $k_{vi}$ is reset within the numerical range of the second pseudo inertia coefficient $k_{vi2}$ defined in the inequality (9). Hence, even if the second pseudo inertia coefficient $k_{vi2}$ assumes a negative value, it is possible to reset the second pseudo inertia coefficient $k_{vi2}$ which satisfies $k_{vi2}+M>0$.

$$M = \frac{\Delta P_m(t_1) - \Delta P_{L0} - (D+k_{vd})(f_1-f_0)}{\frac{df_1}{dt}} - k_{vi} \quad \text{[formula (11)]}$$

Further, in the case where the inertia M of the synchronous generator 30 is unknown, the pseudo inertia coefficient $k_{vi}$ may be reset by computing the inertia M of the synchronous generator 30 at the electric power company operating the power grid, and transmitting the value of the formula (9) described above, including the computed value of the inertia M, to the grid connected inverter 150, for example.

According to the embodiments and modifications described above, it is possible to restore the grid frequency, which varied, within a short period of time, and contribute to the quick stabilization of the grid frequency, by varying the pseudo inertia coefficient after the time when the varied grid frequency reaches the maximum point of frequency variation to a predetermined value, to generate the output active power command of the grid connected inverter. Accordingly, it is possible to provide a grid connected inverter which reduces the grid frequency variation, and a method for reducing the grid frequency variation, which can reduce the grid frequency variation caused by sudden changes in the load, or an output variation of the renewable energy power system within a short period of time.

The present invention is not limited to the embodiments and modifications specifically disclosed above, and various variations, modifications, substitutions, combinations with other techniques, or the like, may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A grid connected inverter, connectable to a power grid having a synchronous generator connected thereto, and operable according to an output active power command generated by a virtual synchronous generator control function, to thereby reduce grid frequency variation, the grid connected inverter comprising:
   a main circuit including power semiconductor switching elements that turn on and off according to the output active power command, to perform DC-AC conversion; and
   a control circuit configured to generate the output active power command, and control the main circuit based on the output active power command,
   wherein the output active power command is represented by a sum of a set value of the output active power of the grid connected inverter, a value obtained by multiplying a pseudo attenuation coefficient to a frequency deviation between a grid frequency and a reference frequency, and a value obtained by multiplying a pseudo inertia coefficient to a derivative value of the grid frequency, and
   wherein the control circuit adjusts the pseudo inertia coefficient after the grid frequency reaches a maximum point of frequency variation to a value smaller than the pseudo inertia coefficient before the grid frequency reaches the maximum point of frequency variation.

2. The grid connected inverter as claimed in claim 1, wherein a renewable energy power system is connected as a DC power supply of the grid connected inverter.

3. The grid connected inverter as claimed in claim 2, wherein the control circuit adjusts the pseudo inertia coefficient to reduce the grid frequency variation caused by sudden changes in a load connected to the power grid, or an output variation of a renewable energy power system connected as a DC power supply of the grid connected inverter.

4. The grid connected inverter as claimed in claim 3, wherein the control circuit sets the value of the pseudo inertia coefficient after the grid frequency reaches the maximum point of frequency variation, based on an inertia of the synchronous generator before the grid frequency reaches the maximum point of frequency variation, and an inertia coefficient of the entire power grid after the grid frequency reaches the maximum point of frequency variation.

5. The grid connected inverter as claimed in claim 4, wherein the control circuit computes the inertia of the synchronous generator before the grid frequency reaches the maximum point of frequency variation, based on a mechanical input variation of the synchronous generator, a load variation that is independent of the grid frequency, an attenuation coefficient of the synchronous generator, the pseudo attenuation coefficient, the pseudo inertia coefficient, the frequency deviation between the grid frequency and the reference frequency, the derivative value of the grid frequency, and the pseudo inertia coefficient at a time before the grid frequency reaches the maximum point of frequency variation.

6. The grid connected inverter as claimed in claim 2, wherein the control circuit sets the value of the pseudo inertia coefficient after the grid frequency reaches the maximum point of frequency variation, based on an inertia of the synchronous generator before the grid frequency reaches the maximum point of frequency variation, and an inertia coefficient of the entire power grid after the grid frequency reaches the maximum point of frequency variation.

7. The grid connected inverter as claimed in claim 6, wherein the control circuit computes the inertia of the synchronous generator before the grid frequency reaches the maximum point of frequency variation, based on a mechanical input variation of the synchronous generator, a load variation that is independent of the grid frequency, an attenuation coefficient of the synchronous generator, the pseudo attenuation coefficient, the pseudo inertia coefficient, the frequency deviation between the grid frequency and the reference frequency, the derivative value of the grid frequency, and the pseudo inertia coefficient at a time before the grid frequency reaches the maximum point of frequency variation.

8. The grid connected inverter as claimed in claim 1, wherein the control circuit adjusts the pseudo inertia coefficient to reduce the grid frequency variation caused by sudden changes in a load connected to the power grid, or an output variation of a renewable energy power system connected as a DC power supply of the grid connected inverter.

9. The grid connected inverter as claimed in claim 1, wherein the control circuit sets the value of the pseudo inertia coefficient after the grid frequency reaches the maximum point of frequency variation, based on an inertia of the synchronous generator before the grid frequency reaches the maximum point of frequency variation, and an inertia coefficient of the entire power grid after the grid frequency reaches the maximum point of frequency variation.

10. The grid connected inverter as claimed in claim 9, wherein the control circuit computes the inertia of the synchronous generator before the grid frequency reaches the maximum point of frequency variation, based on a mechanical input variation of the synchronous generator, a load variation that is independent of the grid frequency, an attenuation coefficient of the synchronous generator, the pseudo attenuation coefficient, the pseudo inertia coefficient, the frequency deviation between the grid frequency and the reference frequency, the derivative value of the grid frequency, and the pseudo inertia coefficient at a time before the grid frequency reaches the maximum point of frequency variation.

11. A method for reducing grid frequency variation in a grid connected inverter, connectable to a power grid having a synchronous generator connected thereto, the method comprising:
    operating the grid connected inverter according to an output active power command, generated by a virtual synchronous generator control function, and represented by a sum of a set value of the output active power of the grid connected inverter, a value obtained by multiplying a pseudo attenuation coefficient to a frequency deviation between a grid frequency and a reference frequency, and a value obtained by multiplying a pseudo inertia coefficient to a derivative value of the grid frequency; and
    adjusting the pseudo inertia coefficient after the grid frequency reaches a maximum point of frequency variation to a value smaller than the pseudo inertia coefficient before the grid frequency reaches the maximum point of frequency variation, to generate the output active power command after the grid frequency reaches the maximum point of frequency variation.

12. The method for reducing grid frequency variation as claimed in claim 11, wherein the operating operates the grid connected inverter according to
    the output active power command represented by a sum of the set value of the output active power of the grid connected inverter, and the value obtained by multiplying the pseudo attenuation coefficient to the frequency deviation between the grid frequency and the reference frequency, when the frequency deviation between the grid frequency and the reference frequency is smaller than a first threshold value, and the output active power command at a time after the grid frequency reaches the maximum point of frequency variation, when the frequency deviation between the grid frequency and the reference frequency exceeds first threshold value.

13. The method for reducing grid frequency variation as claimed in claim 12, wherein the adjusting adjusts the pseudo inertia coefficient to reduce the grid frequency variation caused by sudden changes in a load connected to the power grid, or an output variation of a renewable energy power system connected as a DC power supply of the grid connected inverter.

14. The method for reducing grid frequency variation as claimed in claim 11, wherein the adjusting adjusts the pseudo inertia coefficient to reduce the grid frequency variation caused by sudden changes in a load connected to the power grid, or an output variation of a renewable energy power system connected as a DC power supply of the grid connected inverter.

* * * * *